(12) United States Patent
Hawari et al.

(10) Patent No.: US 10,848,539 B2
(45) Date of Patent: Nov. 24, 2020

(54) GENLOCK MECHANISM FOR SOFTWARE PACING OF MEDIA CONSTANT BIT RATE STREAMS

(71) Applicant: Cisco Technology, Inc., San Jose, CA (US)

(72) Inventors: Mohammed Joseph Hawari, Montigny-le-bretonneux (FR); Andre Jean-Marie Surcouf, St Leu la Foret (FR); Pierre Pfister, Chalons-en-Champagne (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/182,889

(22) Filed: Nov. 7, 2018

(65) Prior Publication Data
US 2020/0099623 A1    Mar. 26, 2020

Related U.S. Application Data (60) Provisional application No. 62/733,863, filed on Sep. 20, 2018.

(51) Int. Cl.
| | |
|---|---|
| *H04L 29/06* | (2006.01) |
| *H04L 12/853* | (2013.01) |
| *H04L 12/931* | (2013.01) |
| *H04N 5/77* | (2006.01) |

(52) U.S. Cl.
CPC ........ *H04L 65/605* (2013.01); *H04L 47/2416* (2013.01); *H04L 49/206* (2013.01); *H04L 65/4069* (2013.01); *H04L 65/4076* (2013.01); *H04L 65/80* (2013.01); *H04N 5/77* (2013.01)

(58) Field of Classification Search
CPC .................................................... H04L 65/605
See application file for complete search history.

(56) References Cited

U.S. PATENT DOCUMENTS

| | | | |
|---|---|---|---|
| 5,586,264 | A | 12/1996 | Belknap et al. |
| 5,805,821 | A | 9/1998 | Saxena et al. |
| 5,856,975 | A | 1/1999 | Rostoker et al. |
| 7,830,881 | B2 | 11/2010 | Takatori et al. |
| 8,238,239 | B2 | 8/2012 | Wadekar et al. |
| 8,711,886 | B2 | 4/2014 | Tapie et al. |
| 8,982,912 | B2 | 3/2015 | Fourcand |
| 2004/0075745 | A1 | 4/2004 | Mance et al. |

(Continued)

OTHER PUBLICATIONS

Jin Tang et al., "RCS: A Rate Control Scheme for Real-Time Traffic in Networks with High Bandwidth-Delay Products and High Bit Error Rates", IEEE INFOCOM 2001, Apr. 22-26, 2001, 9 pages.

*Primary Examiner* — Jason E Mattis
(74) *Attorney, Agent, or Firm* — Edell, Shapiro & Finnan, LLC (57) ABSTRACT

Techniques for communicating packets in a computer network are provided. At a network device, a first stream of packets is obtained from a packet processing node. A second stream of packets is obtained from a packet generating node. A counter is maintained that counts a number of the packets received from the second stream. An internal clock signal of the network device is obtained. A control signal is generated for pacing the first stream of packets based on the counter and the internal clock signal. The first stream of packets is provided to a packet consuming node based on the control signal.

20 Claims, 8 Drawing Sheets

(56) References Cited

U.S. PATENT DOCUMENTS

| | | | |
|---|---|---|---|
| 2007/0174511 A1* | 7/2007 | Yu | G06F 13/28 |
| | | | 710/36 |
| 2007/0237185 A1 | 10/2007 | Pereira et al. | |
| 2010/0008385 A1* | 1/2010 | Noronha, Jr. | H04N 21/2389 |
| | | | 370/545 |
| 2011/0164178 A1* | 7/2011 | Hardy | H04N 21/4307 |
| | | | 348/500 |
| 2012/0236878 A1* | 9/2012 | Shafai | H04L 47/22 |
| | | | 370/474 |
| 2015/0036695 A1* | 2/2015 | Gowda | H04L 47/283 |
| | | | 370/474 |
| 2016/0301583 A1* | 10/2016 | Matsunaga | H04L 43/04 |
| 2019/0082204 A1* | 3/2019 | Surcouf | H04N 21/234381 |

* cited by examiner

GENLOCK MECHANISM FOR SOFTWARE PACING OF MEDIA CONSTANT BIT RATE STREAMS

PRIORITY CLAIM

This application claims priority to U.S. Provisional Application No. 62/733,863, filed Sep. 20, 2018, the entirety of which is incorporated herein by reference.

TECHNICAL FIELD

The present disclosure relates to techniques for pacing media streams in a network.

BACKGROUND

In the context of live video production for the broadcasting industry, the move from Serial Digital Interface (SDI)-based technologies to Internet Protocol (IP)-based video transport has been heavily investigated in recent years. The Society of Motion Picture and Television Engineers (SMPTE) body issued standards defining media transport over IP such as SMPTE 2022/6-7 and the recent SMPTE 2110 family of protocols. The next step is to achieve software processing of these streams on Commodity/Commercial Off-The-Shelf (COTS) hardware and network interface controller (NICs). However, challenges arise because of the asynchronous nature and the amount of jitter introduced by COTS equipment, which is unsuitable in a live video production environment. This jitter problem prevents the video production industry from combining virtualized applications running in a media data center with traditional video appliances that require strict adherence to the SMPTE standard, which in turn slows down the adoption of a traditional data center approach for live video production. This problem can be solved by regenerating a very-low jitter stream using a NIC capable of sending traffic at its line-rate consistently and with a very stable frequency.

However, in a large production-grade broadcasting facility where existing equipment have very small buffers (because of low latency constraints) and maximum tolerance on frame losses is in the order of one per 24 hours, all equipment are synchronized by an external clock that acts as a rising edge for all the SDI/SMPTE operations. When a SMPTE standard dictates a packet rate for a given flow, this centralized clock dictates the actual duration of one second in a consistent way across all video equipment, whereas the NICs from computing nodes do not receive this signal or any equivalent thereof. This, among other things, makes SMPTE streams produced by applications running on COTS X86 hardware incompatible with existing video hardware equipment supporting SMPTE. It is, therefore, important to avoid any frequency mismatch across all virtual or real machines contributing to a production workflow since this would invariably lead to packet drops at some point.

DESCRIPTION OF EXAMPLE EMBODIMENTS

Overview

Techniques for communicating packets in a computer network are disclosed herein. At a network device, a first stream of packets is obtained from a packet processing node. A second stream of packets is obtained from a packet generating node. A counter is maintained that counts a number of the packets received from the second stream. An internal clock signal of the network device is obtained. A control signal is generated for pacing the first stream of packets based on the counter and the internal clock signal. The first stream of packets is provided to a packet consuming node based on the control signal.

EXAMPLE EMBODIMENTS

Packet pacing for the Society of Motion Picture and Television Engineers (SMPTE) 2022 and 2110 protocol families is an important issue. More and more media streams are sent over the Internet on the different Internet Protocol/Serial Digital Interface (IP/SDI) gateways available on the market that have small buffers. Several phenomena that could lead to buffer overflow or starvation for an IP-packet consumer in a real-time packet processing data center. First, sporadic packet drops may occur in a paced media stream. Packet drops could happen because pacing is performed according to the definition of "one second" provided by the internal 156.25 MHz clock of the NIC, which the IEEE 802.3 standard requires to be accurate at ±100 ppm.

Buffer overflow or starvation for an IP-packet consumer may also occur due to packet burstiness. Packet burstiness measures how many packets can arrive "at once" at the consumer. For example, if the consumer has a 4-packet buffer and receives a burst of, for example, 20 packets, this will inevitably trigger packet drops at the consumer. These drops are by nature sporadic and unpredictable according to the jitter added by an intermediate system, e.g., packet processing devices, between the constant rate generator and consumer.

A frequency mismatch may be another reason for buffer overflow or starvation. Even in a perfectly constant-rate environment (with zero bursts), if a consumer consumes video packets at a rate f, the paced traffic arrives at a rate F, and the consumer has a buffer of a size b, then a drift would happen in the buffer that eventually leads at some point to buffer starvation or overflow. The characteristic time T it takes to lead to the drift is in the order of $T=b/|f-F|$. Moreover, a pacer may rely on the Media Access Control (MAC)-layer clock (hereinafter "ETHCLK") to generate constant-rate traffic. That is, a pacer can rely on a clock independent from the one on which the consumer is based, to read incoming packets. The SMPTE/SDI standards mandate the use of fairly accurate clocks, but the IEEE 802.3 Ethernet standard does not have any such requirements. ETHCLK needs to be 156.25 MHz with an accuracy of ±100 ppm. With an SMPTE 2022/6 stream having an f=134775 packets/s and a typical buffer size b=10 packets, a mean time between failure is in the order of T=0.7 s at worst. Techniques are presented herein to reduce the possibility of buffer overflow or starvation at a consumer.

The techniques presented herein accurately pace packets in a media stream. A packet generating node is in synchronization with a packet consuming node. The packet generating node generates packets at a first frequency and sends the generated packets to a packet processing node to convert the packets to a form that can be transmitted to the packet consuming node. The packet processing node then forwards converted packets to a packet pacing device at a second frequency. The packet pacing device includes a controller function that obtains the first frequency from the packet generator such that the packet pacing device forwards the converted packets to the packet consuming node based on the first frequency.

Figure 1A:
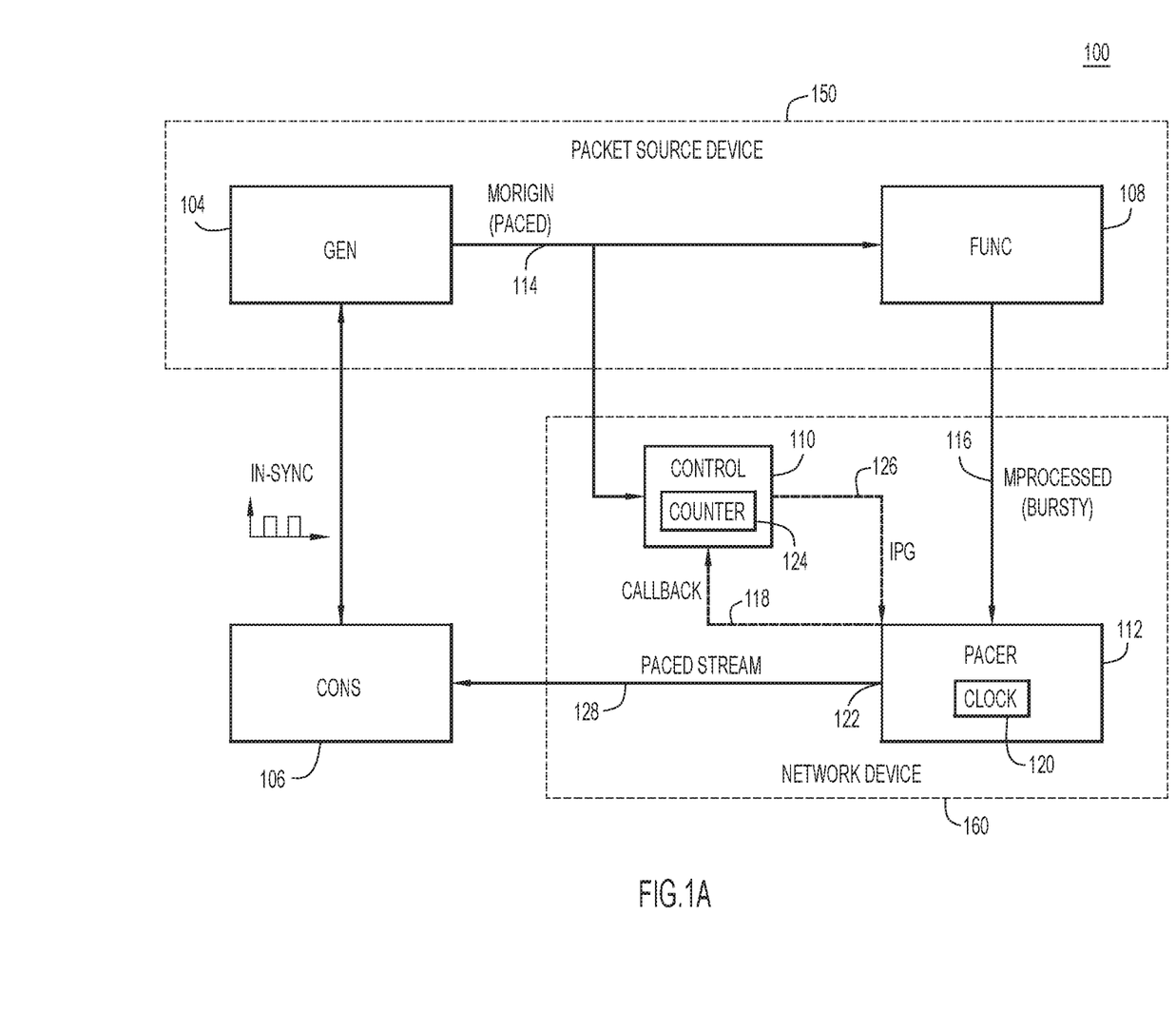
FIG. 1A depicts a system for pacing media stream packets in a network, according to an example embodiment.

Reference is now made to FIG. 1A. FIG. 1A depicts a system 100 for pacing media stream packets, according to an example embodiment. The system 100 includes a packet generating device/node (GEN) 104, a packet consuming device/node (CONS) 106, a media/packet processing device/node (FUNC) 108, a controller (Control) 110, and a packet pacing device/node (PACER) 112. The packet generating device 104 is configured to generate media packets for the packet consuming device 106. The packet generating device 104 is synchronized with the packet consuming device 106 by some known mechanism. For example, these devices can be synchronized with each other with an SDI black burst signal. The packet generating device 104 is configured to generate and provide a stream of packets (Morigin) 114 to the packet processing device 108. In some embodiments, the packet generating device 104 transmits the stream of packets 114 to the packet processing device 108 at a frequency that synchronizes the packet generating device 104 with the packet consuming device 106.

The packet processing device 108 can be any COTS device that receives media packets, e.g., stream 114, from the packet generating device 104 and processes the received packets, which are accurately paced. In some embodiments, the packet processing device 108 may be an SMPTE converter that converts packets of an uncompressed media format to an SMPTE data standard for sending SDI data over an IP network. In some embodiments, the SMPTE converter may be a component of the video source device (such as a video camera).

In some embodiments, the packet processing device 108 may be integrated with the packet generating device 104 as a single packet source device 150. For example, the packet source device 150 can be a network-enabled video source device integrated with an SMPTE converter. In general, the packet source device 150 can be any network-enabled device that functions as a packet source device integrated with one or more packet processing functions.

Once the packets are processed, the packet processing device 108 provides the processed packets in a packet stream (Mprocessed) 116 to the packet pacing device 112. For example, data packets that have been converted to the SMPTE format are transmitted to the packet pacing device 112. Generally, the packet pacing device 112 may be embodied as software executing on one or more computing devices that are configured to control the pace of delivery of the media data packets to the packet consuming device 106. In some embodiments, the packet pacing device 112 may be part of a network device, such as a router, a switch, a bridge, a hub, etc. In some embodiments, the packet consuming device 106 may be an IP/SDI gateway. In some embodiments, the packet processing device 108 running on COTS equipment introduces a jitter in sending the processed media packets such that the IP/SDI gateway CONS 106 cannot accept it because of its low buffering capacity.

The packet pacing device 112 is configured to pace the packets sent to the packet consuming device 106. In some embodiments, the packet pacing device 112 is configured to call a control function (CONTROL_CALLBACK) each time it sends W seconds worth of traffic to the packet consuming device 106 at a line rate that includes dummy bytes and relevant data/media packets. That is, an internal clock signal referred to as CALLBACK 118, is sent from the packet pacing device 112 to the controller 110 every W seconds (a predetermined time period), for a second defined as in an internal clock ETHCLK (ETHCLK-seconds) 120 of the packet pacing device 112. A line rate L is 1250000000 (in bytes per second) for a 10 Gbps interface, for example. A line rate is associated with an interface 122 at the packet pacing device 112 in communication with the packet consuming device 106.

The controller 110 is configured to receive the stream 114 of packets from the packet generating device 104. In some embodiments, the controller 110 maintains a counter 124 that counts a number of the packets received from the stream 114. The controller 110 is configured to receive the internal clock signal CALLBACK 118 from the packet pacing device 112 and the count of the counter 124 indicating the number of packets received from the packet generating device 104 in packet stream 114. In some embodiments, whenever the controller 110 receives the internal clock signal 118, the controller fetches the counts of the counter 124 and resets the counter 124 to zero. Based on the time information (internal clock signal) received from the packet pacing device 112 and the counter 124, the controller 110 is configured to generate a control message/signal referred to as inter packet gap (IPG) control signal 126, for the packet pacing device 112. For example, the controller 110 may calculate a paced rate of packets being sent from the packet generating device 104 every W seconds, based on the time information received from the packet pacing device 112 and the number of packets sent from the packet generating device 104. The controller 110 is further configured to determine an inter packet gap for pacing the stream 116 received from the packet processing device 108. In some embodiments, an inter packet gap may be calculated as a ratio of a line rate over the paced rate (line rate/paced rate) minus a size of a packet for pacing. The controller 110 provides the IPG control signal 126 to the packet pacing device 112.

The IPG control signal 126 controls the packet pacing device 112, and the IPG control signal 126 can be received every W seconds after the callback function is initiated to reflect real-time situations. In one embodiment, the IPG control signal 126 specifies how many dummy "Ethernet bytes" are sent by the packet pacing device 112 between two relevant media packets. Based on the IPG control signal 126, the packet pacing device 112 forwards the received stream 116 of packets as a paced stream 128 of packets to the packet consuming device 106.

In some embodiments, the controller 110 may be integrated with the packet pacing device 112 in a network device 160 that communicates packets between the packet generating device 104 and the packet consuming device 106. In some embodiments, the functions of the controller 110 may be embodied in software instructions or hardware components. In one embodiment, the functions of the controller 110 may be software instructions executable by a processor of the network device 160. For example, the network device 160 may be a router, a switch, a bridge, a hub, a storage node, a computing node, etc.

Operation of the system 100 is described hereinafter with continued reference to FIG. 1A. First, packet generating device 104 sends packets Morigin 114 on a multicast address, while packet processing device 108 sends packets Mprocessed 116. The controller 110 listens to Morigin 114 to determine the number of packets sent. The controller 110 further receives CALLBACK 118 every W seconds from the packet pacing device 112 and generates the IPG control signal 126. In one embodiment, W may be one ETHCLK second. In another embodiment, W may be 1-5 ETHCLK seconds. The selection of W may depend on the environment, e.g., the clock 120 on which the packet generating device 104 and the packet consuming device 106 are based. The packet pacing device 112 can listen to/monitor packets in stream Mprocessed 116 to pace them. Moreover, the packet pacing device 112 receives the IPG control signal 126 for pacing the packets. Morigin 114 can be used as a software emulation of a reference-clock since the stream originating from packet generating device 104 is coming from an SDI/IP gateway, which is accurately paced because the frequency of the SDI/IP gateway is in synchronization with a corresponding SDI/IP gateway used by CONS 106. That is, Morigin 114 carries the timing information that can be used to adjust the frequency of the pacing at the packet pacing device 112 to enable it to serve as a "software genlock".

In some embodiments, the processing device 108 may include a plurality of sub-nodes The controller 110 maintains a counter to count a number of packets received from the packet stream Morigin 114. Pseudo code of an example algorithm for maintaining counter is provided below:

```
Maintain a counter COUNTER of the number of packets received from Morigin, as such: While(true)
RecvPacketFromMorigin( )
FETCH_AND_ADD(COUNTER,1) //Atomically increase COUNTER
EndWhile
```

The controller 110 is further configured to generate a control signal for the packet pacing device 112. Pseudo code of an example algorithm for generating a control signal in a form of an inter packet gap is provided below:

```
Program CONTROL_CALLBACK so that every W ETHCLK-seconds,
it adjust IPG to achieve the correct pacing.
CONTROL_CALLBACK:=
packets_received <- FETCH_AND_RESET(COUNTER) // atomically
get the value of COUNTER and reset it to 0
rate <- packets_received/W
IPG <- (L/rate) – size_of_video_packet
```

In some embodiments, after the controller 110 generates the IPG control signal 122, the controller 110 sends the IPG control signal 122 to the packet pacing device 112, which is used as a command frequency, so that the packet pacing device 112 can track the reference stream Morigin 114, which is accurately paced. In one embodiment, the computations are made in the ETHCLK-seconds time domain, due to the CONTROL_CALLBACK being called at a regular interval as defined by the ETHCLK clock 120, which is not the wall clock time of the machine on which it runs.

Considerations for selecting W are now explained. If W is too short, any measurement artifacts would make the IPG control signal 126 artificially oscillating, leading to buffer overflows and underflows at the consumer packet consuming device 106; whereas if W is too long, the feedback loop implemented in the above algorithm would introduce too much of a delay between any slight frequency variation at the packet generating device 104 and the implemented response at IPG control signal 126. For example, in one embodiment, a number of packets received can be ±4 packets invariably and independently from the value of W.

In some embodiments, the controller 110 can maintain N (N≥2) last values of the measured rate and update the IPG control signal 126 according to an average of the rates instead of updating IPG control signal 126 according to the last measured value of packets received per W ETHCLK-seconds. In one embodiment, when W is set to be 1 (W=1), N is selected to be 2 (N=2). In another embodiments, W is set to be one of 1-5, N may be selected to be one of 2-5 (N=2-5). This technique allows to still update the IPG control signal 126 frequently enough (by having a reasonably small W) and at the same time amortize any fixed error due to averaging over the N last values. That is, this implementation provides a two stage filtering compensation feedback loop.

Figure 1B:
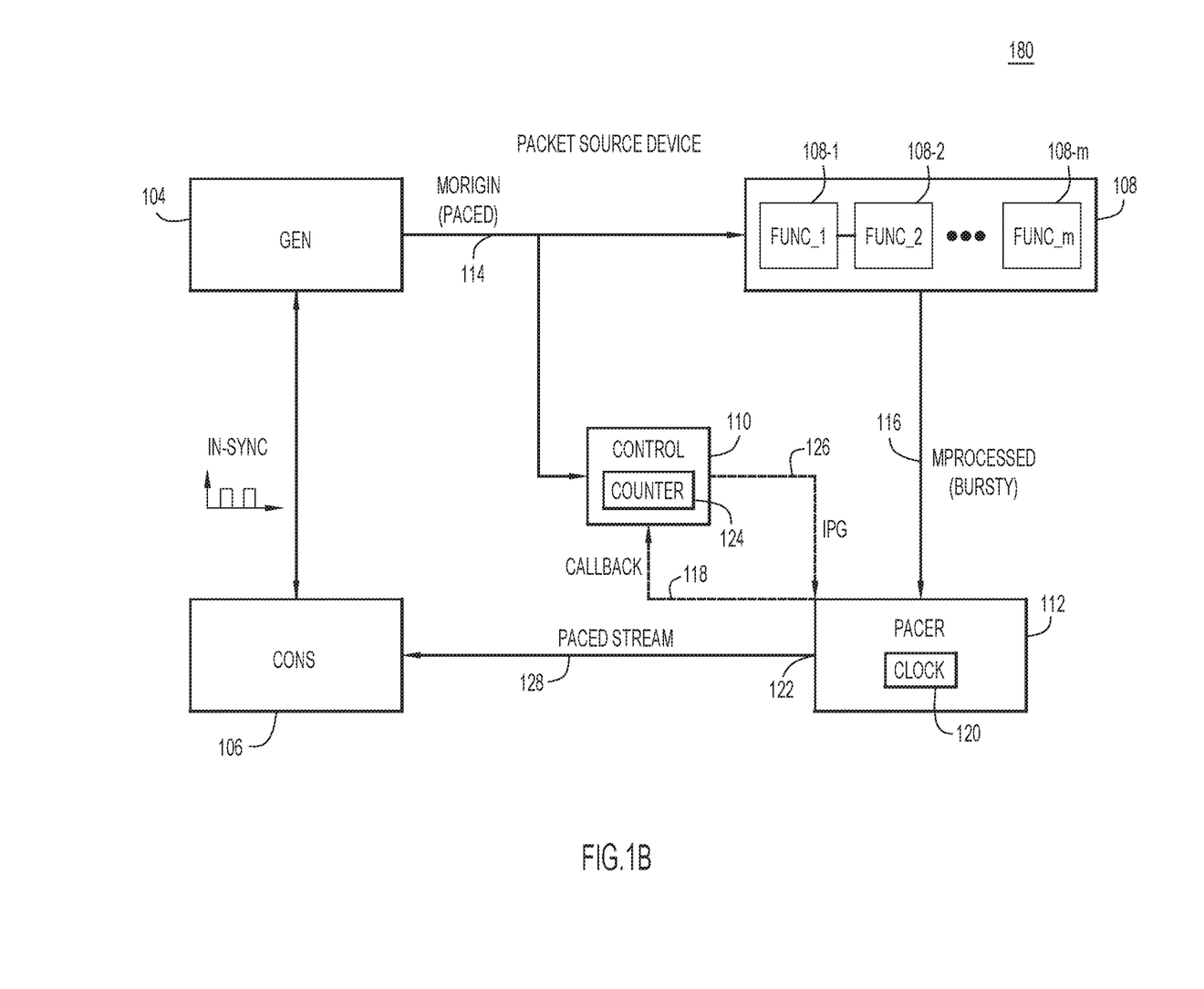
FIG. 1B depicts another system for pacing media stream packets in a network, according to an example embodiment.

In some embodiments, the packet processing node 108 may include multiple sub-nodes, each of which may perform a different processing operation on received packets. An example system 180 including such as packet processing node is illustrated in FIG. 1B. System 180 is similar to system 100 shown in FIG. 1A, except that the packet processing node 108 includes a plurality of sub-nodes (FUNC-1, FUNC-2 . . . FUNC-m) 108-1 to 108-m. The sub-nodes 108-1 to 108-m may perform different operations on packets of stream 114 to prepare the packets to be consumed by the packet consuming node 106. For example, the sub-nodes 108-1 to 108-m may convert the packets into a suitable format, provide image or audio compensation on the packets, encode the packets, etc.

Figure 2:
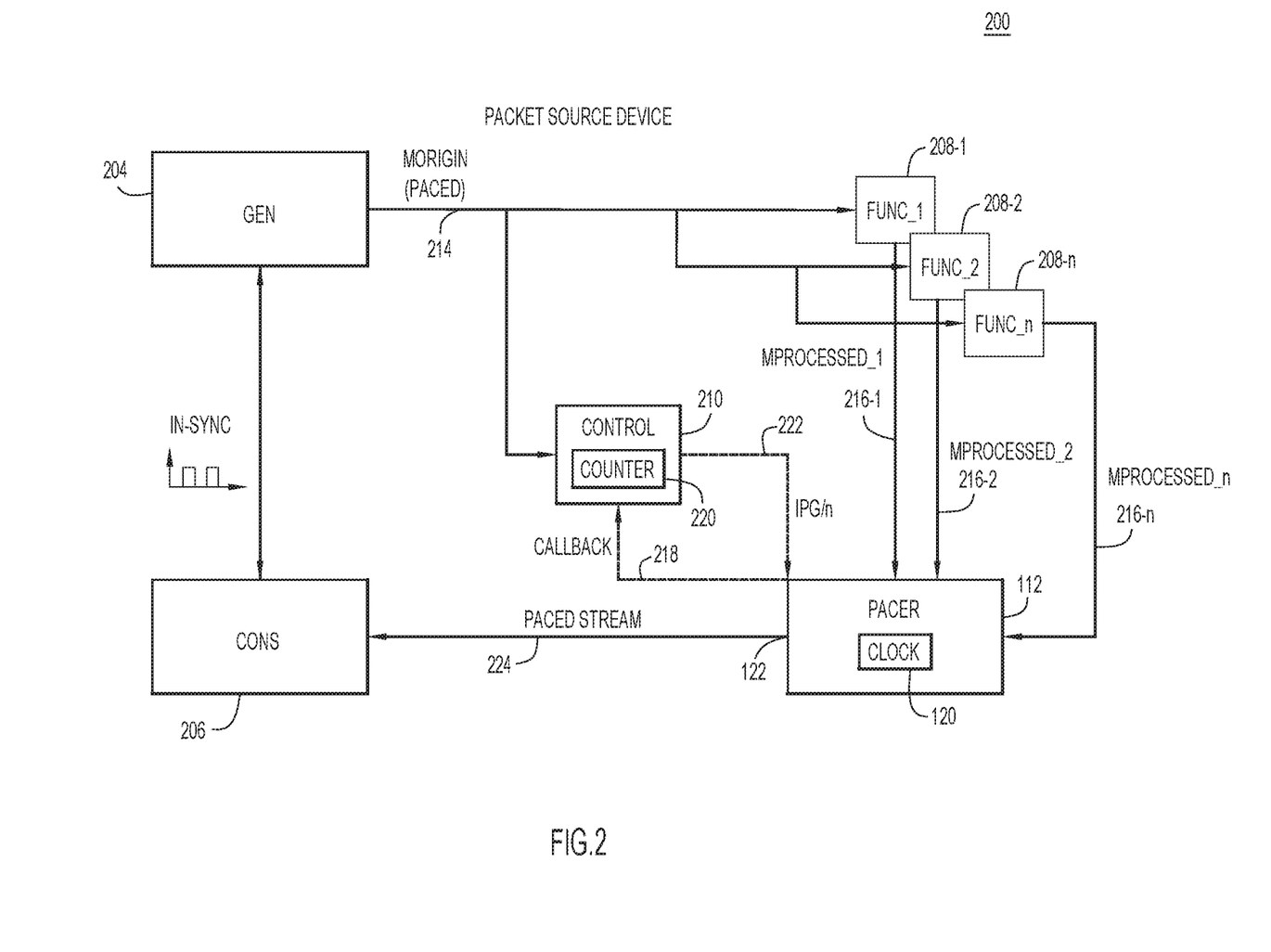
FIG. 2 depicts a different system featuring multiple packet processing devices, according to an example embodiment.

In some embodiments, a single packet stream Morigin from a packet generating device can be used for pacing packets from multiple packet processing devices. To this end, reference is now made to FIG. 2. FIG. 2 depicts a system 200 for pacing media stream packets that includes multiple packet processing devices, according to one example embodiment. The system 200 includes a packet generating device (GEN) 204, a packet consuming device (CONS) 206, a plurality of packet processing devices (FUNC_1, FUNC_2 . . . FUNC_n) 208-1 to 208-n, a controller (Control) 210, and a packet pacing device (PACER) 212. Each of the plurality of packet processing devices 208-1 to 208-n receives media packets in stream 214 from the packet generating device 204. These packet processing devices FUNC_1, FUNC_2 . . . FUNC_n generate multiple processed streams, Mprocessed_1 (216-1), Mprocessed_2 (216-2), . . . Mprocessed_n (216-n), respectively. A single software reference stream Morigin 214 can be used to infer the correct IPG and pace the multiple processed streams 216-1 to 216-n at the same time. For example, every W seconds the packet pacing device 212 invokes a callback function to send time information (CALLBACK) 218 to the controller 210. Similar to the configuration in FIG. 1A, the controller 210 maintains a counter 220 to count a number of packets received in the stream 214. Instead of injecting the IPG control signal 222 into packet packing device 212, the controller 210 is configured to inject IPG/n. Further, instead of packet pacing device 212 sending one media packet at a time, the packet packing device 212 is configured to send one packet from each incoming stream Mprocessed_1, Mprocessed_2, . . . Mprocessed_n, alternately. In one embodiment, for an SMPTE 2022/6 stream that is on the order of 1.56 Gbps, these techniques allow the use of a single reference stream Morigin 214 to pace 6 different burst SMPTE 2022/6 streams on a single 10 Gbps link.

Figure 3:
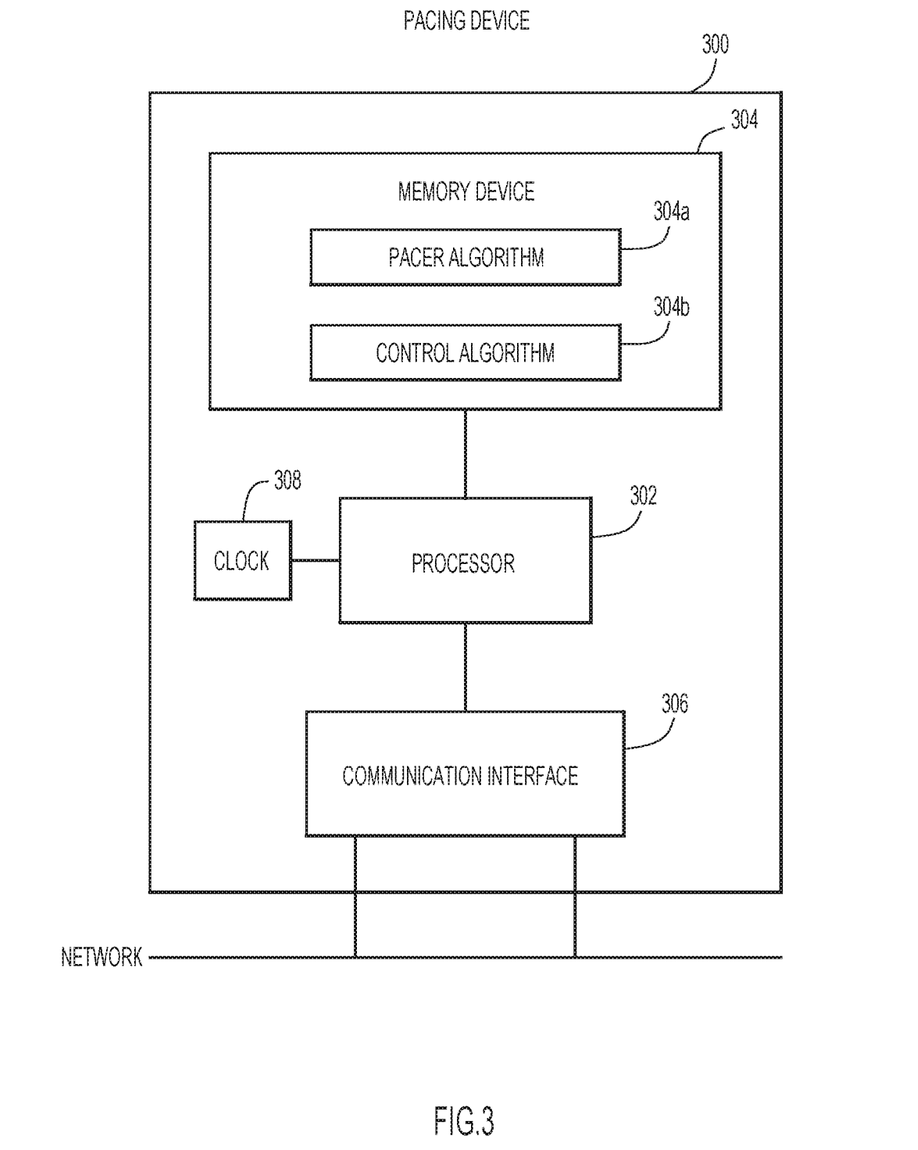
FIG. 3 is block diagram of a pacing device configured to participate in the pacing mechanisms presented herein, according to an example embodiment.

FIG. 3 depicts a block diagram of a packet pacing device 300 to participate in the techniques disclosed herein and serve as the packet pacing device 112 or 212 shown in FIGS. 1 and 2, according to one example embodiment. The packet pacing device 300 may be a network device and it may include the controller 110 or 210 referred to above in FIGS. 1 and 2. The packet pacing device 300 includes a processor 302, a memory 304, a communication interface 306, and an internal clock 308. The processor 302 may be a microprocessor or microcontroller (or multiple instances of such components) that is configured to execute program logic instructions (i.e., software) for carrying out various operations and tasks described herein. For example, the processor 302 is configured to execute instructions stored in the memory 304 for performing pacing and control operations as explained above.

The memory 304 may include read only memory (ROM), random access memory (RAM), magnetic disk storage media devices, optical storage media devices, flash memory devices, electrical, optical or other physical/tangible memory storage devices. The memory 304 stores various data and computer-executable instructions including the algorithms described herein. For example, the memory 304 stores executable instructions to perform a pacer algorithm 304a configured to pace one or more packet streams received from one or more packet processing devices. The memory 304 also stores executable instructions to perform a control algorithm 304b configured to perform the control functions of the controller 110 and 220 as described herein.

The functions of the processor 302 may be implemented by logic encoded in one or more tangible (non-transitory) computer-readable storage media (e.g., embedded logic such as an application specific integrated circuit, digital signal processor instructions, software that is executed by a processor, etc.), wherein the memory 304 stores data used for the operations described herein and stores software or processor executable instructions that are executed to carry out the operations described herein.

In one embodiment, the processor 302 may be embodied by digital logic gates in a fixed or programmable digital logic integrated circuit, which digital logic gates are configured to perform storage and accessing control operations described herein. In general, the pacer algorithm 304a and control algorithm 304b may be embodied in one or more non-transitory computer-readable storage media encoded with software comprising computer executable instructions and when the software is executed operable to perform the operations described herein.

The communication interface 306 is configured to transmit communications to, and receive communications from, a computer network for the pacing device 300. In one example, the communication interface 306 may take the form of one or more network interface cards.

The internal clock 308 may take the form of a clock circuit. The internal clock may operate at 156.25 MHz having accuracy at ±100 ppm according to the IEEE 802.3 standard. The internal clock 308 is configured to provide time signals to the processor 302 for pacing packets as described herein.

Figure 4:
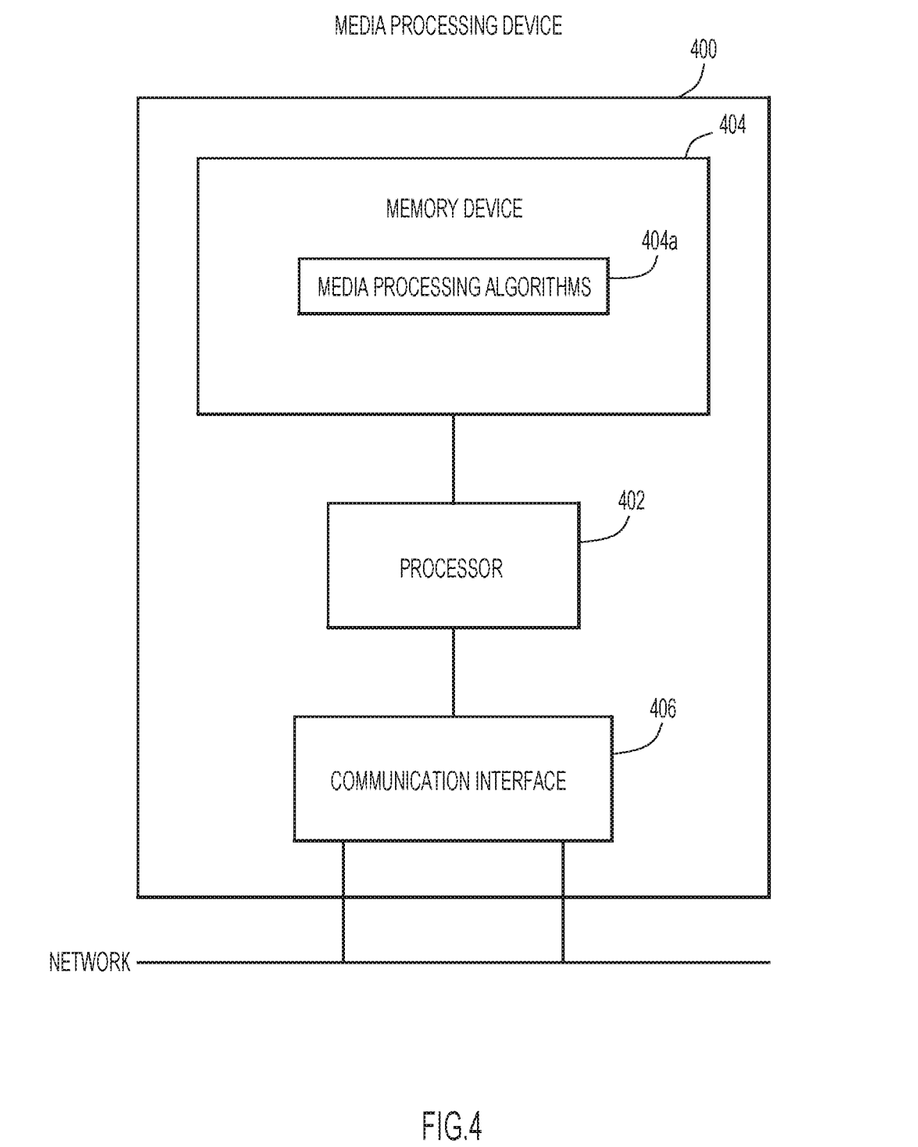
FIG. 4 is block diagram of a packet processing device configured to participate in the pacing mechanisms presented herein, according to an example embodiment.

FIG. 4 depicts a block diagram of a packet processing device 400 to participate in the mechanisms disclosed herein, according to one example embodiment. For example, the packet processing device 400 may serve as the packet processing device 108 or 208 shown in FIGS. 1 and 2. The packet processing device 400 includes a processor 402, a memory 404, and a communication interface 406. The processor 402 may be a microprocessor or microcontroller (or multiple instances of such components) that is configured to execute program logic instructions (i.e., software) for carrying out various operations and tasks described herein. For example, the processor 402 is configured to execute instructions stored in the memory for generating converted media packets as explained above.

The memory 404 may include ROM, RAM, magnetic disk storage media devices, optical storage media devices, flash memory devices, electrical, optical or other physical/tangible memory storage devices. The memory 404 stores various data and computer-executable instructions including the algorithms described herein. For example, the memory 404 stores instructions for performing one or more media processing algorithms 404a configured to process packets received from a packet generating device.

The functions of the processor 402 may be implemented by logic encoded in one or more tangible (non-transitory) computer-readable storage media (e.g., embedded logic such as an application specific integrated circuit, digital signal processor instructions, software that is executed by a processor, etc.), wherein the memory stores data used for the operations described herein and stores software or processor executable instructions that are executed to carry out the operations described herein.

In one embodiment, the processor 402 may be embodied by digital logic gates in a fixed or programmable digital logic integrated circuit, which digital logic gates are configured to perform the packet processing algorithms 404a. In general, the packet processing algorithms 404a may be embodied in one or more non-transitory computer-readable storage media encoded with software comprising computer executable instructions and when the software is executed operable to perform the operations described herein.

The communication interface 406 is configured to transmit communications to, and receive communications from, the network for the packet processing device 400. In one example, the communication interface 406 may take the form of one or more network interface cards.

The packet generating device and the packet consuming device as described above may have similar physical structures as the packet processing device, but include different software algorithm for their various functions. In some embodiments, a packet processing device may be integrated with a packet generating device and both share the same computing resources (e.g., processors and memories) and networking resources (e.g., network interfaces).

Figure 5:
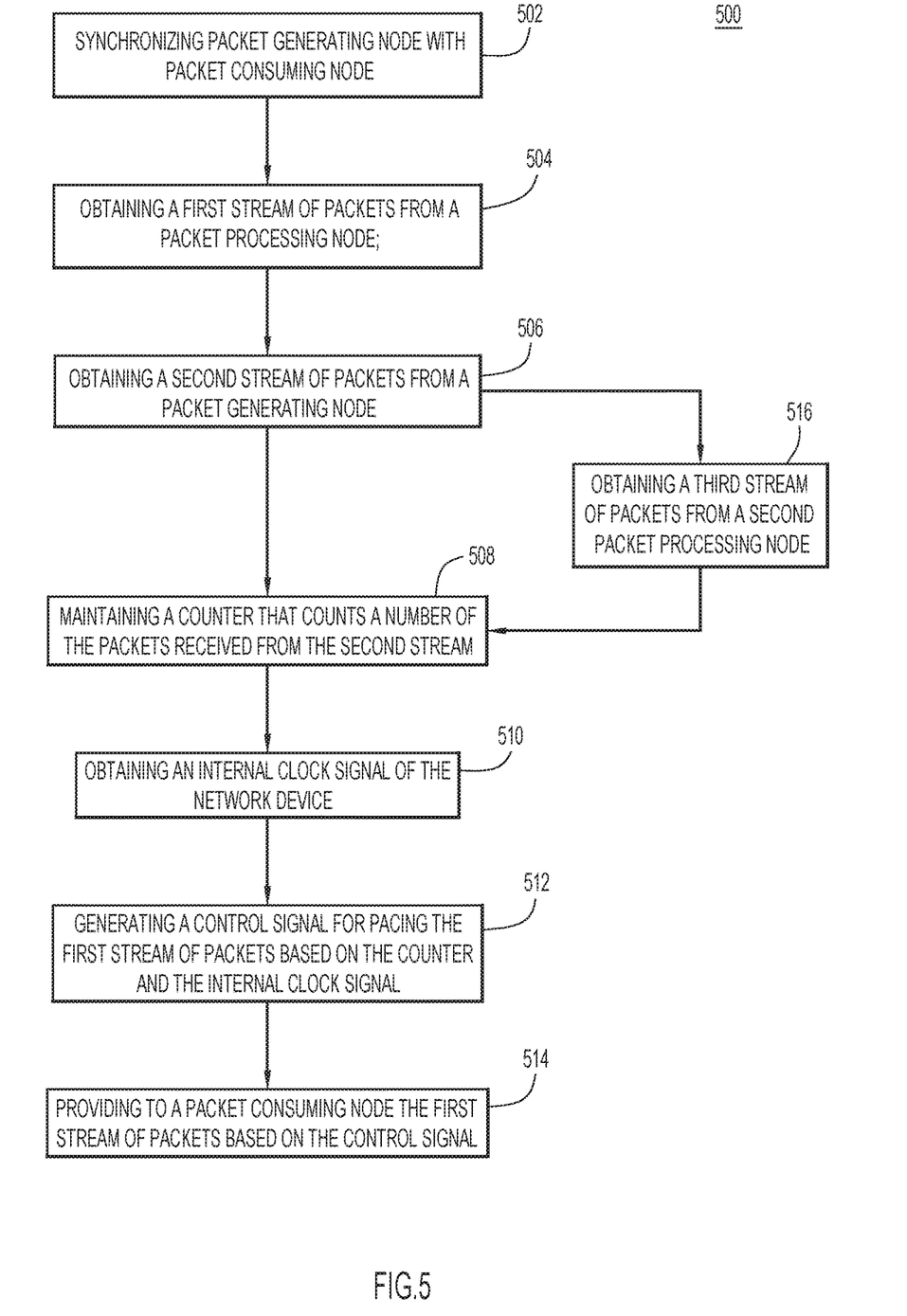
FIG. 5 is a flow chart depicting a method performed by the packet pacing system, according to an example embodiment.

FIG. 5 is a flow chart illustrating a method 500 performed in a packet pacing system, such as that shown in FIGS. 1 and 2, according to one example embodiment. The packet pacing system includes a packet generating node configured to generate packets for a packet consuming node, a packet processing node configured to processing the packets received from the packet generating node, and a packet pacing node configured to pace packets received from the packet processing node and to be forwarded to the packet consuming node. The packet pacing node may be a network device that communicates packets to the packet consuming node.

At 502, the packet generating node is synchronized with the packet consuming node. For example, the packet generating node may be synchronized with the packet consuming node using an SDI black burst signal. At 504, the packet pacing node obtains a first stream of packets from the packet processing node via a link therebetween. The packets in the first stream are generated by the packet generating node and processed by the packet processing node. In one embodiment, the packet processing node converts packets from an uncompressed media format to an SMPTE data standard such that the packets in the first stream are in the SMPTE data standard.

At 506, the packet pacing node obtains a second stream of packets from the packet generating node. The second stream of packets from the packet generating node are transmitted at a pace using the synchronized frequency between the packet consuming node and the packet generating node. As a result, the second stream of packets includes an accurate pace for the packet consuming node. At 508, the packet pacing node maintains a counter that counts a number of the packets received from the second stream. For example, whenever the packet pacing node receives a packet from the second stream, the counter is increased by one. Over time, the counter indicates a number of packets received from the second stream. At 510, the packet pacing node obtains an internal clock signal based on an internal clock maintained in the packet pacing node. The clock may operate at 156.25 MHz having accuracy of ±100 ppm according to the IEEE 802.3 standard. In some embodiments, the packet pacing node obtains the internal clock signal based on the internal clock each time a predetermined time period elapses.

At 512, the packet pacing node generates a control signal for pacing the first stream of packets based on the counter and the internal clock signal. For example, the packet pacing node may perform a callback function when the predetermined time period defined by the internal clock elapses. The callback function fetches the counts of the counter indicating a number of packets received from the second stream within the predetermined time period. The packet pacing node then calculates a control signal based on the predetermined time period and the counts. In some embodiments, the control signal includes an inter packet gap indication. At 514, the packet pacing node provides to the packet consuming node the first stream of packets based on the control signal. Because the control signal is generated based on the second stream of packets that are accurately paced, the packets provided by the packet pacing node to the packet consuming node can also be accurately paced, thereby reducing a memory overflow or underflow at the packet consuming node.

In some embodiments, the second stream of packets may be employed to pace multiple streams of processed packets from a plurality of packet processing nodes. For example, method 500 may further include operation 516 where the packet pacing node obtains a third stream of packets from a second packet processing node. In response to obtaining the third stream of packet, the packet pacing node at 512 generates the control signal for pacing both the first stream and the third stream of packets. At 514, the packet pacing node provides one packet from the first stream and one packet from the third stream alternately based on the control signal.

Figure 6:
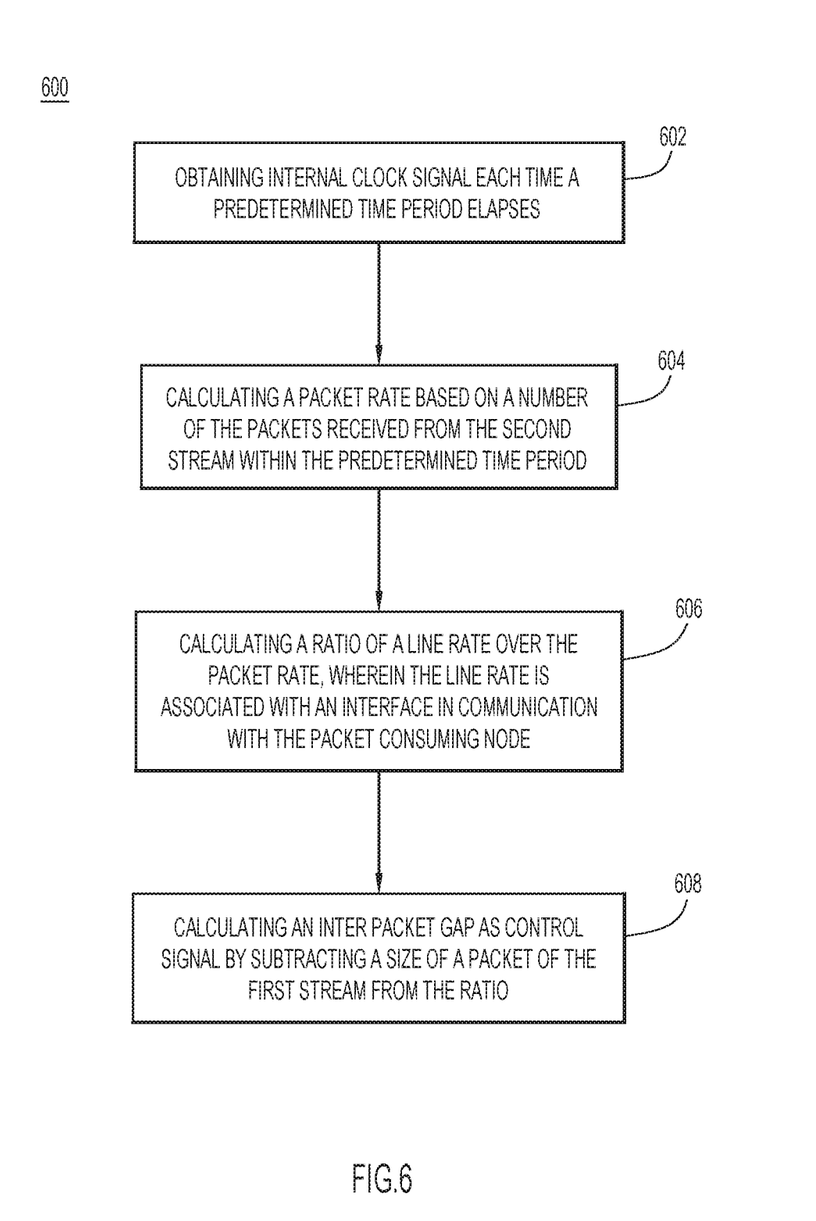
FIG. 6 is a flow chart illustrating a method performed by a packet pacing node that generates control signals for pacing packets in the method illustrated in FIG. 5, according to an example embodiment.

FIG. 6 is a flow chart illustrating a method 600 performed by a packet pacing node for generating control signals for pacing packets in operation 512 of the method 500 shown in FIG. 5, according to one example embodiment. At 602, the packet pacing node obtains an internal clock signal each time a predetermined time period elapses. For example, the packet pacing node may include an internal clock and obtains an internal clock signal every W seconds, with a second defined by (or with respect to) the internal clock. In some embodiments, the predetermined time period may be 1-5 seconds. In one embodiment, the predetermined time period is set at one second. At 604, the packet pacing node calculates a paced rate based on a number of the packets received from the second stream within the predetermined time period. In some embodiments, a paced rate is calculated as a quotient of the number of the packets received from the second stream divided by the predetermined time period. At 606, the packet pacing node calculates a ratio of a line rate over the paced rate. The line rate is associated with an interface of the packet pacing node in communication with the packet consuming node. At 608, the packet pacing node calculates an inter packet gap by subtracting a size of a packet of the first stream from the ratio. The inter packet gap is then used by the packet pacing node for pacing one or more packet streams containing processed packets.

Figure 7:
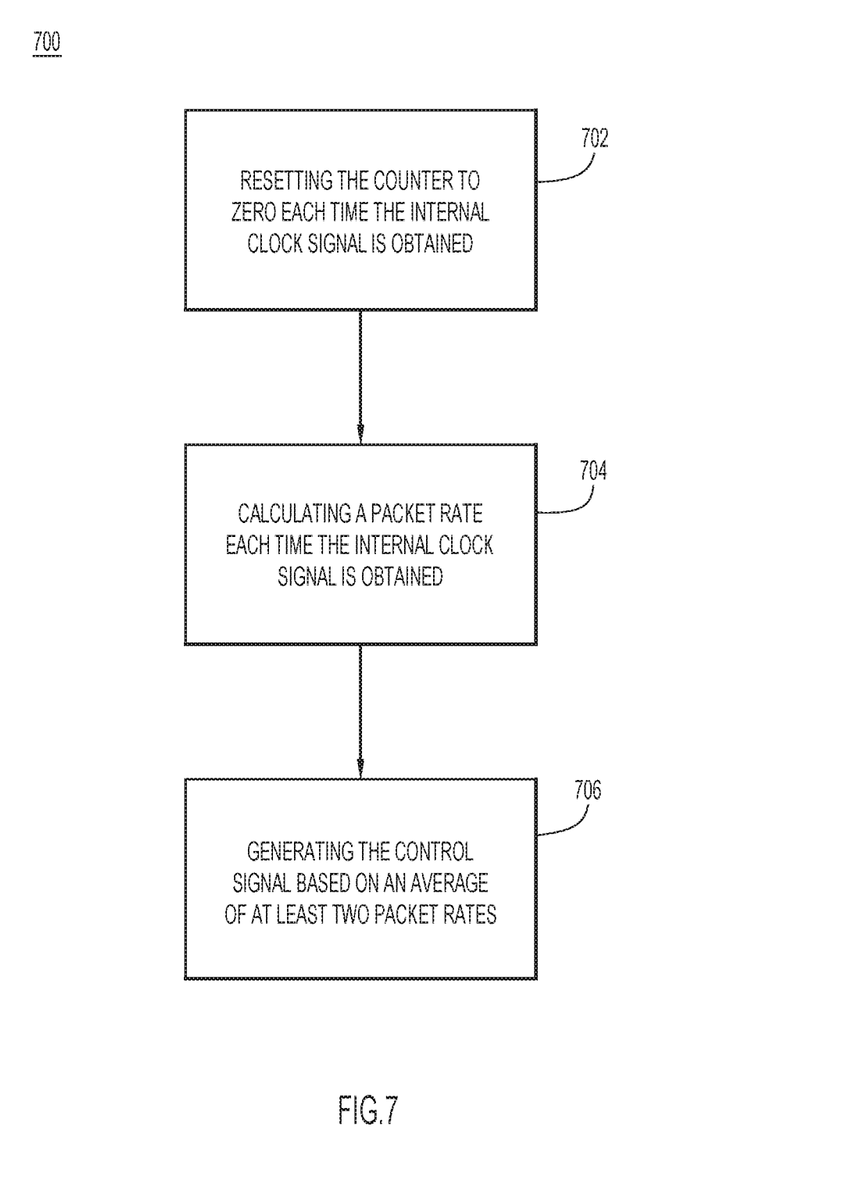
FIG. 7 is a flow chart illustrating another method performed by a packet pacing node for generating control signals for pacing packets, according to an example embodiment.

FIG. 7 is a flow chart illustrating a method 700 performed by a packet pacing node for generating control signals for pacing packets, according to one example embodiment. At 702, the packet pacing node resets the counter to zero each time the internal clock signal is obtained. The counter associated with the packet pacing node is increased by one for each a packet in a stream received from the packet generating node. When the packet pacing node obtains an internal clock signal, the counter is reset to zero. This allows that counter to start counting incoming packets before a subsequent internal clock signal is obtained. At 704, the packet pacing node calculates a paced rate each time the internal clock signal is obtained. A paced rate is calculated by dividing a number of packets received from a packet stream originated from the packet generating node by a time period between two internal clock signals. In some embodiments, the packet pacing node may save/store the calculated paced rates in a memory. At 706, the packet pacing node generates a control signal based on an average of at least two paced rates. For example, the packet pacing node can generate a control signal based on an average of the latest paced rated and at least one prior paced rate. The techniques allows for frequently updating the control signal and at the same time amortize any fixed error resulting from averaging on the last values of the paced rate. In some embodiments, the control signals are generated based on the last two to five paced rates stored in the memory device.

To summarize, presented herein are techniques for pacing packets for raw uncompressed video data. These techniques provide a genlock/blackburst signal that results in frequency accuracy in packet pacing. The techniques also enable creating a hybrid packet processing workflow made of a combination of virtual and real appliances. The techniques can be used at any media data center ingress or egress to guarantee strict compatibility with legacy hardware equipment. In one embodiment, the techniques allow for running live video streaming with no buffer overflow/underflow for more than four consecutive days, which outperforms the "one frame loss per day" maximum of a typical broadcasting installation.

Moreover, the techniques use an auxiliary and correctly paced video stream (Morigin) as a basis for packet pacing instead of the original unpaced stream (Mprocessed) because the original unprocessed stream Mprocessed would not allow a timely timing recovery as it is generally irregular. In one form, obtaining the exact frequency from the unpaced stream (Mprocessed) would require the use of large values of W and N, which from a signal processing perspective, means a Proportional Integral feedback control loop with a higher-delay, which is unable to track correctly the frequency.

Time accounting techniques referred to herein are achieved by counting the exact number of bytes sent on a, for example, 40 Gb/s link, instead of using the local timer of the system. Also, the pacing algorithm receives inter packet gap values as an input command as the inter packet gap values represent "bytes on the wire" and not "microseconds from the wall-clock."

In one form, a method is provided. The method includes, at a network device, obtaining a first stream of packets from a packet processing node; obtaining a second stream of packets from a packet generating node; maintaining a counter that counts a number of the packets received from the second stream; obtaining an internal clock signal of the network device; generating a control signal for pacing the first stream of packets based on the counter and the internal clock signal; and providing to a packet consuming node the first stream of packets based on the control signal.

In some embodiments, the internal clock signal is obtained each time a predetermined time period elapses. The method further includes calculating a paced rate based on a number of the packets received from the second stream within the predetermined time period.

In some embodiments, the method further includes calculating a ratio of a line rate over the paced rate. The line rate is associated with an interface in communication with the packet consuming node.

In some embodiments, the control signal indicates an inter packet gap.

In some embodiments, the method further includes calculating the inter packet gap by subtracting a size of a packet of the first stream from the ratio.

In some embodiments, the method further includes: resetting the counter to zero each time the internal clock signal is obtained; calculating a paced rate each time the internal clock signal is obtained; and generating the control signal based on an average of at least two paced rates.

In some embodiments, the packet processing node is a first packet processing node and the method further includes: obtaining a third stream of packets from a second packet processing node, wherein the control signal is generated for pacing the first stream of packets and the third stream of packets, and wherein the network device provides one packet from the first stream and one packet from the third stream alternately based on the control signal.

In some embodiments, the packet generating node is in synchronization with the packet consuming node at a first frequency. The packet generating node provides the second stream of packets to the packet processing node at the first frequency.

In another form, an apparatus is provided. The apparatus includes a network interface that enables network communications, a processor, and a memory to store data and instructions executable by the processor. The processor is configured to execute the instructions to: obtain a first stream of packets from a packet processing node; obtain a second stream of packets from a packet generating node; maintain a counter that counts a number of the packets received from the second stream; obtain an internal clock signal of the apparatus; generate a control signal for pacing the first stream of packets based on the counter and the internal clock signal; and provide to a packet consuming node the first stream of packets based on the control signal.

In yet another form, a non-transitory computer-readable storage medium is provided. The non-transitory computer-readable storage medium is encoded with software comprising computer executable instructions which, when executed by a processor, cause the processor to: obtain a first stream of packets from a packet processing node; obtain a second stream of packets from a packet generating node; maintain a counter that counts a number of the packets received from the second stream; obtain an internal clock signal of a network device; generate a control signal for pacing the first stream of packets based on the counter and the internal clock signal; and provide to a packet consuming node the first stream of packets based on the control signal.

The above description is intended by way of example only. The present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Although the techniques are illustrated and described herein as embodied in one or more specific examples, it is nevertheless not intended to be limited to the details shown, since various modifications and structural changes may be made within the scope and range of equivalents of this disclosure.

What is claimed is:

1. A method comprising:
   at a network device:
   obtaining a first stream of packets from a packet processing node configured to convert packets of an uncompressed media format to packets of a serial digital interface (SDI) over Internet Protocol (IP) format;
   obtaining a second stream of packets from a packet generating node configured to generate the packets of the uncompressed media format;
   maintaining a counter that counts a number of the packets received from the second stream;
   obtaining an internal clock signal of the network device;
   generating a control signal for pacing the first stream of packets based on the counter and the internal clock signal; and
   providing to a packet consuming node the first stream of packets based on the control signal.

2. The method of claim 1, wherein the internal clock signal is obtained each time a predetermined time period elapses, the method further comprising:
   calculating a paced rate based on a number of the packets received from the second stream within the predetermined time period.

3. The method of claim 2, further comprising:
   calculating a ratio of a line rate over the paced rate, wherein the line rate is associated with an interface in communication with the packet consuming node.

4. The method of claim 3, wherein the control signal indicates an inter packet gap.

5. The method of claim 4, further comprising calculating the inter packet gap by subtracting a size of a packet of the first stream from the ratio.

6. The method of claim 2, further comprising:
resetting the counter to zero each time the internal clock signal is obtained;
calculating a paced rate each time the internal clock signal is obtained; and
generating the control signal based on an average of at least two paced rates.

7. The method of claim 1, wherein the packet processing node is a first packet processing node, the method further comprising:
obtaining a third stream of packets from a second packet processing node,
wherein the control signal is generated for pacing the first stream of packets and the third stream of packets, and
wherein the network device provides one packet from the first stream and one packet from the third stream alternately based on the control signal.

8. The method of claim 1, wherein the packet generating node is in synchronization with the packet consuming node at a first frequency, wherein the packet generating node provides the second stream of packets to the packet processing node at the first frequency.

9. An apparatus comprising:
a network interface that enables network communications;
a processor; and
a memory to store data and instructions executable by the processor,
wherein the processor is configured to execute the instructions to:
obtain a first stream of packets from a packet processing node configured to convert packets of an uncompressed media format to packets of a serial digital interface (SDI) over Internet Protocol (IP) format;
obtain a second stream of packets from a packet generating node configured to generate the packets of the uncompressed media format;
maintain a counter that counts a number of the packets received from the second stream;
obtain an internal clock signal of the apparatus;
generate a control signal for pacing the first stream of packets based on the counter and the internal clock signal; and
provide to a packet consuming node the first stream of packets based on the control signal.

10. The apparatus of claim 9, wherein the internal clock signal is obtained each time a predetermined time period elapses, wherein the processor is configured to:
calculate a paced rate based on a number of the packets received from the second stream within the predetermined time period.

11. The apparatus of claim 10, wherein the processor is configured to:
calculate a ratio of a line rate over the paced rate, wherein the line rate is associated with an interface in communication with the packet consuming node.

12. The apparatus of claim 11, wherein the control signal indicates an inter packet gap.

13. The apparatus of claim 12, wherein the processor is configured to calculate the inter packet gap by subtracting a size of a packet of the first stream from the ratio.

14. The apparatus of claim 10, wherein the processor is configured to:
reset the counter to zero each time the internal clock signal is obtained;
calculate a paced rate each time the internal clock signal is obtained; and
generate the control signal based on an average of at least two paced rates.

15. The apparatus of claim 9, wherein the packet processing node is a first packet processing node, the processor is configured to:
obtain a third stream of packets from a second packet processing node,
wherein the control signal is generated for pacing the first stream of packets and the third stream of packets, and
wherein the processor is configured to provide one packet from the first stream and one packet from the third stream alternately based on the control signal.

16. A non-transitory computer-readable storage medium encoded with software comprising computer executable instructions which, when executed by a processor, cause the processor to:
obtain a first stream of packets from a packet processing node configured to convert packets of an uncompressed media format to packets of a serial digital interface (SDI) over Internet Protocol (IP) format;
obtain a second stream of packets from a packet generating node configured to generate the packets of the uncompressed media format;
maintain a counter that counts a number of the packets received from the second stream;
obtain an internal clock signal of a network device;
generate a control signal for pacing the first stream of packets based on the counter and the internal clock signal; and
provide to a packet consuming node the first stream of packets based on the control signal.

17. The non-transitory computer-readable storage medium of claim 16, wherein the internal clock signal is obtained each time a predetermined time period elapses, and wherein the instructions further cause the processor to:
calculate a paced rate based on a number of the packets received from the second stream within the predetermined time period.

18. The non-transitory computer-readable storage medium of claim 17, wherein the instructions further cause the processor to:
calculate a ratio of a line rate over the paced rate, wherein the line rate is associated with an interface in communication with the packet consuming node.

19. The non-transitory computer-readable storage medium of claim 18, wherein the control signal indicates an inter packet gap.

20. The non-transitory computer-readable storage medium of claim 19, wherein the instructions further cause the processor to calculate the inter packet gap by subtracting a size of a packet of the first stream from the ratio.

* * * * *